United States Patent [19]
Bergman et al.

[11] Patent Number: 5,059,865
[45] Date of Patent: Oct. 22, 1991

[54] XENON-METAL HALIDE LAMP PARTICULARLY SUITED FOR AUTOMOTIVE APPLICATIONS

[75] Inventors: Rolf S. Bergman, Cleveland Heights; John M. Davenport, Lyndhurst; Richard L. Hansler, Pepper Pike, all of Ohio

[73] Assignee: General Electric Company, Schenectady, N.Y.

[21] Appl. No.: 539,276

[22] Filed: Jun. 18, 1990

Related U.S. Application Data

[63] Continuation of Ser. No. 157,436, Feb. 18, 1988, abandoned.

[51] Int. Cl.[5] ........................ B60Q 1/02; H01J 61/12
[52] U.S. Cl. ........................................ 315/82; 315/77; 315/83; 313/641; 313/642; 313/571
[58] Field of Search ........................................ 315/358

[56] References Cited

U.S. PATENT DOCUMENTS

| | | | |
|---|---|---|---|
| 3,398,312 | 8/1968 | Edris et al. | 313/642 |
| 3,842,304 | 10/1974 | Beyer et al. | 313/44 |
| 4,197,480 | 4/1980 | Ryan, Jr. | 313/25 |
| 4,594,529 | 6/1986 | de Vrijer | 313/571 |
| 4,808,876 | 2/1989 | French et al. | 313/635 X |
| 4,868,458 | 9/1989 | Davenport et al. | 315/77 |

*Primary Examiner*—Eugene R. LaRoche
*Assistant Examiner*—Ali Neyzari
*Attorney, Agent, or Firm*—George E. Hawranko; John P. McMahon; Stanley C. Corwin

[57] ABSTRACT

A lamp containing a fill of xenon, mercury and metal halide is disclosed which serves as a light source for lighting applications and is particularly suitable for automotive forward lighting applications. The xenon ingredient operates to provide for instant light necessary for automotive applications, whereas, the mercury and metal·halide ingredients operate to provide for a long life, high efficiency lamp relative to either a xenon or tungsten lamp. The dimensions of the xenon-metal halide lamp of the present invention are approximately three-fifths (3/5) of those of a typical tungsten lamp utilized for automotive forward lighting applications. The reduced dimensions of the xenon-metal halide lamp allows for correspondingly reduced dimensions of a related reflector for such a xenon-metal halide lamp which accommodates the needs of aerodynamically styled automobiles.

20 Claims, 4 Drawing Sheets

XENON-METAL HALIDE LAMP PARTICULARLY SUITED FOR AUTOMOTIVE APPLICATIONS

This application is a continuation of application Ser. No. 157,436, filed Feb. 18, 1988, abandoned.

CROSS REFERENCE TO RELATED APPLICATION,

U.S. patent application Ser. Nos. 157,360 and 157,359 filed herewith, respectively for "Metal Halide Lamp Having Vacuum Shroud For Reducing Cataphoretic Effects" of Hansler, French and Davenport and "Xenon Lamp Particularly Suited For Automotive Applications" of Davenport and Hansler, all assigned to the same assignee as the present invention, are all related to the present invention.

BACKGROUND OF THE INVENTION

The present invention relates to a discharge lamp especially suited for forward lighting applications of a vehicle such as an automobile, truck, bus, van or tractor. More particularly, the discharge lamp is a xenon-metal halide lamp for an vehicle headlamp having instant light capability, a relatively long life, and a relatively high efficiency.

Automotive designers are interested in lowering the hood lines of cars in order to improve their appearance and also their aerodynamic performance. As discussed in the cross-referenced U.S. application Ser. No. 157,359, the amount that the hood lines may be lowered is limited by the dimensions of the automotive headlamp, which, in turn, is limited by the dimensions of the light source itself which is typically comprised of a tungsten filament.

As disclosed in U.S patent application Ser. No. 157,359, a xenon discharge light source having dimensions which are substantially reduced relative to a tungsten light source allows for the reduction of the overall size of the reflector of the automotive headlamp so that the hood lines of the automobile may be substantially reduced by the automotive designers. In addition, the disclosed xenon discharge light source has an instant start capability similar to a tungsten filament and therefore is particularly suited for automotive applications.

The xenon light source while serving its desired functions suffers some disadvantage in that its efficiency is less than that of other discharge lamp types such as a metal halide lamp. This disadvantage is partly due because the operating voltage of the xenon lamp, finding use in automotive applications is relatively low such as 15 volts. This causes a large fraction of the energy consumed by such a xenon lamp to be dissipated by the electrodes of the xenon lamp rather than contributing to the light output. A further reason for the lower efficiency is that the xenon spectrum contains a relatively large amount of infrared energy which serves no useful purpose for automotive applications and is also detrimental to the plastic housing of the automobile headlamp.

It is desired that a discharge lamp such as a metal halide lamp be provided so as to serve the needs of the automotive headlamp. It is further desired, that the metal halide lamp provide for substantially instant light output such as that of a xenon lamp or tungsten incandescent light source. Still further, in addition to the metal halide lamp serving the needs of automobile, it is desired that the metal halide lamp find lighting applications in the home, office and other commercial and industrial usages.

Accordingly, it is an object of the present invention to provide a metal halide discharge light source for lighting applications and which is particularly suited to serve the needs of the automobile by allowing for substantially instant light.

It is a further object of the present invention to provide a metal halide discharge lamp having relatively small dimensions so as to allow for reduction in its related reflector of the headlamp, which, in turn allows for a reduction in the hood lines desired for aerodynamically styled automobiles.

SUMMARY OF THE INVENTION

The present invention is directed to a xenon-metal halide discharge light source finding various lighting applications and which is particularly suited for a headlamp for automotive applications.

In one embodiment an automotive headlamp comprises a reflector, a lens, and an inner envelope. The reflector has a section to which is mated means capable of being connected to an excitation source of an automobile. The reflector also has a predetermined focal length. The lens of the automotive headlamp is mated to the front section of the reflector. The inner envelope of the automotive lamp is predeterminently positioned within the reflector so as to be approximately disposed near the focal length of the reflector. The inner envelope contains a fill of xenon at a relatively high pressure, an amount of mercury, and a metal halide. The inner envelope has a pair of electrodes separated from each other by a predetermined distance. The inner envelope is connected to the means mated to the section of the automotive lamp so that the excitation source is capable of being applied across the electrodes, whereby upon such application the fill of xenon contained in the inner envelope is excited so as to produce a significant amount of light which is then followed by vaporization and ionization of the mercury along with the metal halide ingredients. The ionization of the xenon and the metal halide develops a high intensity high efficiency source of light that is located between the electrodes.

DETAILED DESCRIPTION OF THE PREFERRED EMBODIMENTS

Figure 1:
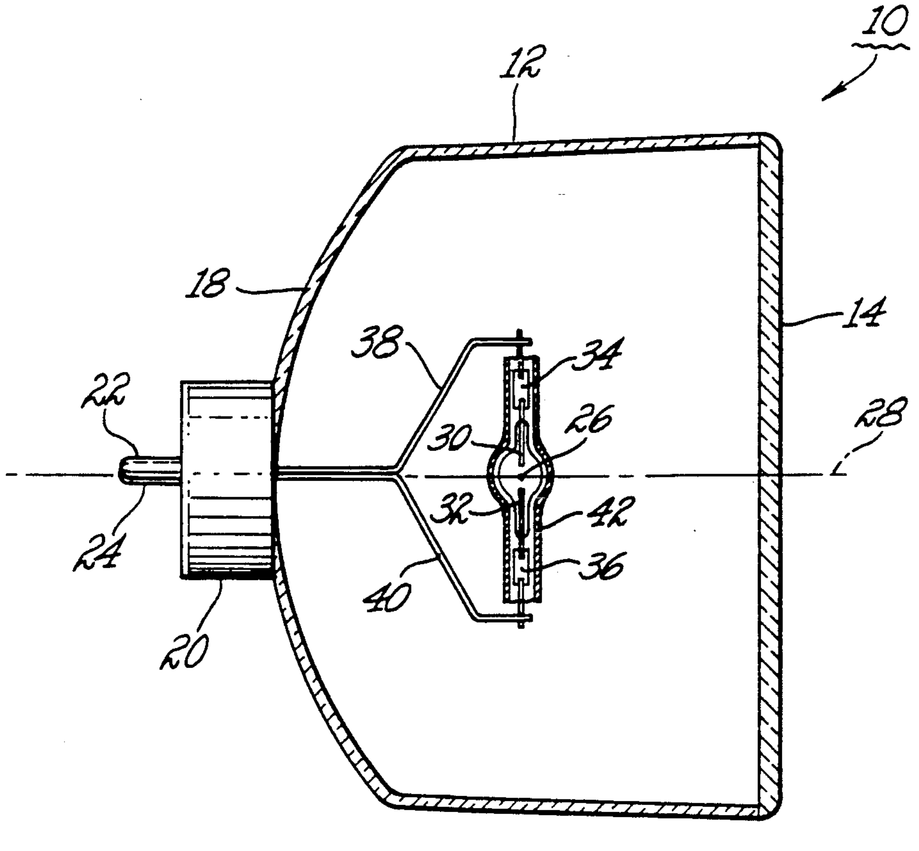
FIG. 1 is a side view generally illustrating an automotive headlamp in accordance with the present invention having its light source orientated in a vertical manner.

FIG. 1 is a side view generally illustrating an automotive headlamp 10 in accordance with one embodiment of the present invention comprising a reflector 12, a lens 14 and an inner envelope 16.

The reflector 12 has a rear section 18 having means mounted thereon, such as a connector 20 with prongs 22 and 24 capable of being connected to a excitation source on an automobile.

The reflector 12 has a predetermined focal length 26 occurring along the axis 28 of the automotive headlamp 10. The reflector 12 has a parabolic shape with a focal length in the range of about 6 mm to about 35 mm with a preferred range of about 8 mm to about 20 mm. The lens 14 is mated to the front section of the reflector 12. The lens 14 is of a transparent material selected from the group consisting of glass and plastic. The transparent member has a face preferably formed of prism members.

The inner envelope 16 is predeterminently positioned within the reflector so as to be approximately disposed near the focal length 26 of the reflector. For the embodiment illustrated in FIG. 1, the inner envelope 16 is oriented in a vertical and transverse manner relative to the axis 28 of the reflector 12, whereas, FIG. 2 illustrates the inner envelope 12 as being oriented in a horizontal manner relative to and along the axis 28 of the reflector 12.

Figure 2:
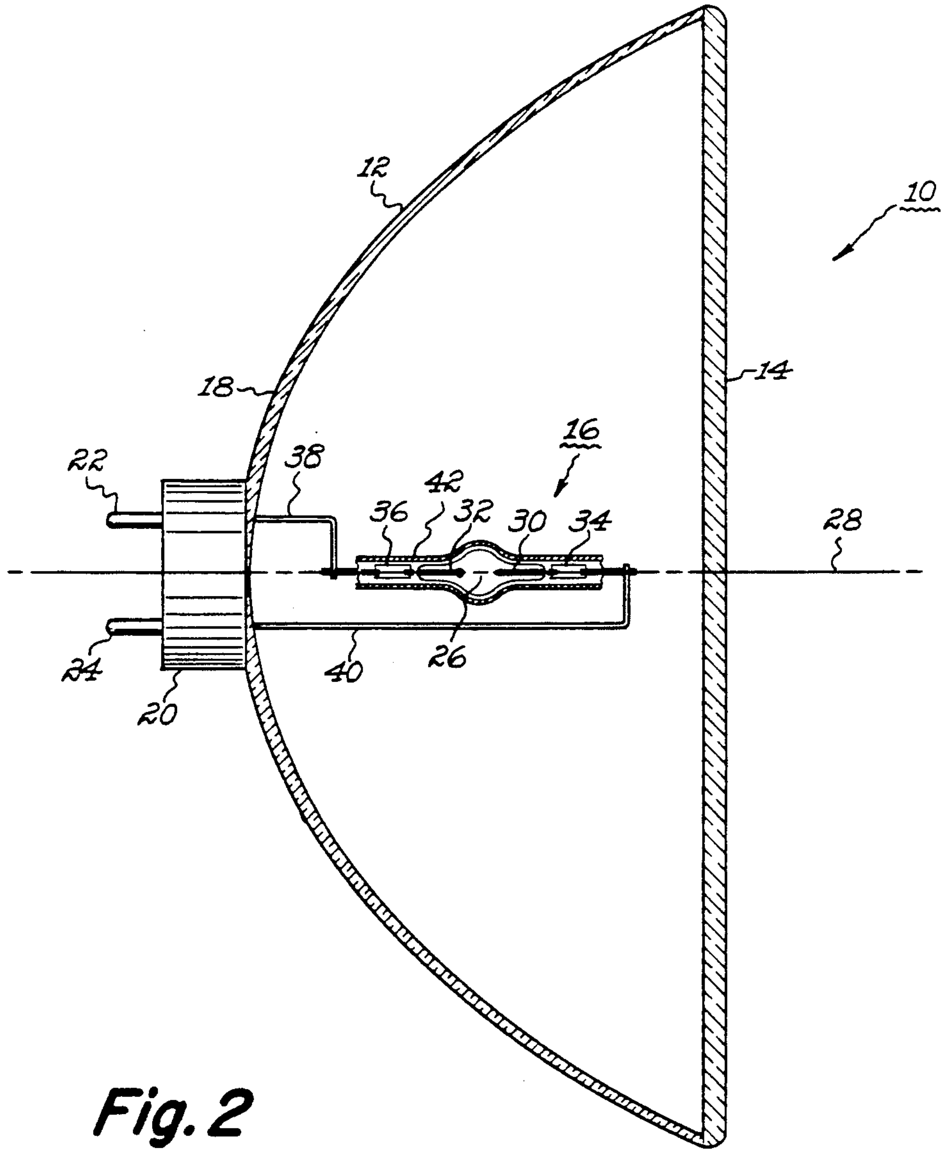
FIG. 2 is a side view generally illustrating an automotive headlamp in accordance with the present invention having its light source oriented in a horizontal axial manner.

The inner envelope 16 of FIGS. 1 and 2 is illustrated as being of a double-ended type having a pair of electrodes 30 and 32 disposed at opposite ends in the neck sections of the inner envelope and separated from each other by predetermined distance in the range of about 2 mm to about 4 mm. The inner envelope 16 may also be of a single-ended type with both electrodes disposed at the same end of the lamp and separated from each other by the given predetermined range. The pair of electrodes are of a rod-like members formed of the materials selected from the group preferably comprising of tungsten, and tungsten with 1-3% thorium oxide. In one embodiment related to an inner envelope of a quartz material, the rod-like electrodes are respectively connected to foil members 34 and 36 sealed in opposite neck portion of the inner envelope. The foil members 34 and 36 are electrically connected to relatively thick inner leads 38 and 40, which, in turn, are respectively connected to prongs 22 and 24. In another embodiment related to an inner envelope preferably of a type #180 glass available from the General Electric Company, the rod-like tungsten electrodes may be welded to molybdenum inleads which may be directly sealed in the #180 glass thereby eliminating the need of the foil members 34 and 36.

The electrodes 30 and 32 are preferably of the spot-mode type disclosed in U.S. Pat. No. 4,574,219, of Davenport et al. and herein incorporated by reference. The spot-mode electrodes coated with a cement material disclosed in Table 3 of U.S. Pat. No. 4,574,219 develop thermionic emission to supply the needs of a thermionic arc condition within the inner envelope 16 in a substantially instantaneous manner.

The inner envelope 16 is of an elongated body having an overall length in the range of about 15 mm to about 40 mm, neck portions with a diameter in the range of about 2 mm to about 5 mm, and bulbous shape central portion having a mid-portion with an outer diameter in the range of about 6 mm to about 15 mm. The inner diameter of the bulbous shaped central portion is in the range from about 4 mm to 12 mm. The inner envelope 16 may have a coating 42 preferably on its outer surface which is preferably a multi-layer infrared reflecting film of alternating layers preferably of tantalum oxide and silicon dioxide or titanium oxide and silicon dioxide. The multi-layer infrared reflective film improves the efficiency of the operating lamp 16, to be described, by reflecting infrared energy emitted by the lamp back toward the arc of the lamp so that the arc temperature may be increased and maintained without any further increases in input power from the excitation source. The infrared reflective coating 42 is also advantageous in that it incidentally absorbs the ultraviolet energy of the lamp 16 which might otherwise cause degradation to the plastic or other parts of the headlamp 10. The process of absorbing the ultraviolet and reflecting the infrared electromagnetic energy has the additional benefit of increasing the heating rate of the lamp 16 which speeds-up or increases the vaporization and ionization of the mercury and the metal halide within the lamp 16 and thereby shortens the warm-up time of the xenon-metal-halide lamp 16 as it operates with the xenon high pressure.

The fill contained in the xenon-metal halide lamp 16 is comprised of xenon, mercury and a metal halide. The xenon fill has a fill pressure at room temperature in the range of about 2 atmospheres to about 15 atmospheres. The mercury contained in the xenon-metal halide lamp is in an amount in the range of about 2 mg to about 10 mg. The amount of mercury is chosen so that with a bulb of a certain size and a distance between the electrodes of a certain amount the voltage drop across the lamp is a convenient value and such that the convection currents within the lamp that produce bowing of the arc do not produce excessive bowing. The operating pressure which is the result of both the xenon and the mercury is in the range of about 3 to 100 atmospheres. The metal halide is a mixture of an amount in the range of about 4 mg to about 12 mg. The mixture is comprised of halides selected from the group given in Table 1.

TABLE 1

| |
|---|
| Sodium Iodine |
| Scandium Iodine |
| Thallium Iodine |
| Indium Iodine |
| Tin Iodine |
| Dysprosium Iodine |
| Holmium Iodine |
| Thulium Iodine |
| Thorium Iodine |
| Cadmium Iodine |
| Cesium Iodine |

One preferred choice of the above ingredients is a mixture of sodium and scandium iodides with a molar ratio of about 19:1. The xenon-metal halide lamp 16 of the present invention is particularly suited to serve as a light source for automotive forward lighting applications.

The initial application of the excitation source across the electrodes of the xenon-metal halide lamp causes the fill of xenon to ionize and produce light instantly and then by continuing the application of the excitation source cause the vaporization and the ionization of the mercury along with the metal halide. The amount of instant light varies linearly with the xenon pressure within the inner envelope. The xenon ingredient of the xenon-metal halide lamp envelope operates to provide sufficient instant light for automotive applications, whereas, the mercury and metal halide ingredients operate to provide for a long life higher efficiency headlamp compared to a discharge lamp containing only xenon or a tungsten filament lamp, for automotive applications. The xenon-metal halide light source having a relatively short distance of 3 mm between the electrodes provides for substantially instant starting by means of the xenon gas which yields an adequate light output for initial automotive applications. The xenon-metal halide lamp warms up within 30 seconds and the mercury and metal halide ionization provides for a high efficacy output.

In order for the xenon-metal halide lamp to be operated in its cold condition, a current of 5 amps at a voltage of 12 V is supplied to the lamp so as to be operated at about 60 watts. As the mercury and metal halide within the lamp ionize and vaporize, the voltage across the lamp gradually rises to about 40 volts and the current is adjusted to approximately 1 amp so as to operate the lamp at be approximately 40 watts.

When the xenon-metal halide lamp is energized in a cold condition, the mercury in the metal halide lamp is mostly condensed as are the metal halides, and the lamp is essentially operating as a high pressure xenon lamp. During such initial conditions, the high intensity light spots are located in front of one of the electrodes which provides a region of moderate brightness. As the xenon-metal halide lamp 16 warms up, the xenon emission is gradually augmented by the mercury and metal halide emissions. As the voltage across the lamp begins to rise and as the current delivered to the lamp begins to drop, the electrode loss of the metal halide lamp decreases and correspondingly causes the efficacy of the lamp to increase.

In the practice of the invention, a 19:1 molar mixture of sodium and scandium iodide along with an amount of mercury necessary to produce the voltage drops of about 30–50 V and a 5 atmosphere fill-pressure of xenon was utilized for the xenon-metal halide lamp having the dimensions and was successfully operated to meet the needs of the automobile in which it may be housed according to one embodiment of the present invention. The selection of other metal halides are advantageous and provide for certain colors which are advantageous to automotive applications.

The xenon-metal halide lamp of the present invention by the use of the high pressure xenon provides light of a sufficient magnitude during the first few seconds of the lamp operation to provide for the illumination needs of the automotive. After these first few seconds have expired, the discharge of the xenon is augmented by the mercury and metal halide components within the inner envelope to provide for a high efficiency light output. The automotive headlamp 10 of the present invention may provide the low beam illumination needs of the automobile when the xenon-metal halide lamp is excited with a voltage and current of 30 V, and 1.4 A respectively. The high beam illumination may be provided with the same excitation.

One of the advantages of the high efficiency metal halide is that because of its relatively small arc dimensions it allows for the reduction in the dimensions of reflector in which it is housed to form an automotive headlamp and thereby allows for a reduction in the hood lines of the automobile previously discussed in the "Background". Such a reduction may be described with reference to FIGS. 3(A) and 3(B).

Figure 3A:
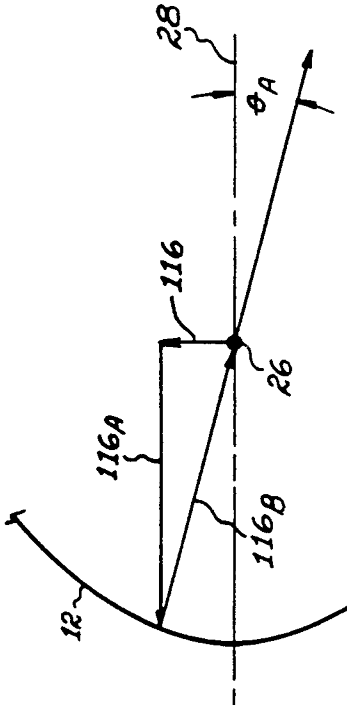
FIGS. 3(A) and 3(B) respectively illustrate a comparison between the light beam divergence developed by a filament light source and the beam divergence developed by the smaller xenon-metal halide light source of the present invention in reflectors of the same size.
Figure 3B:
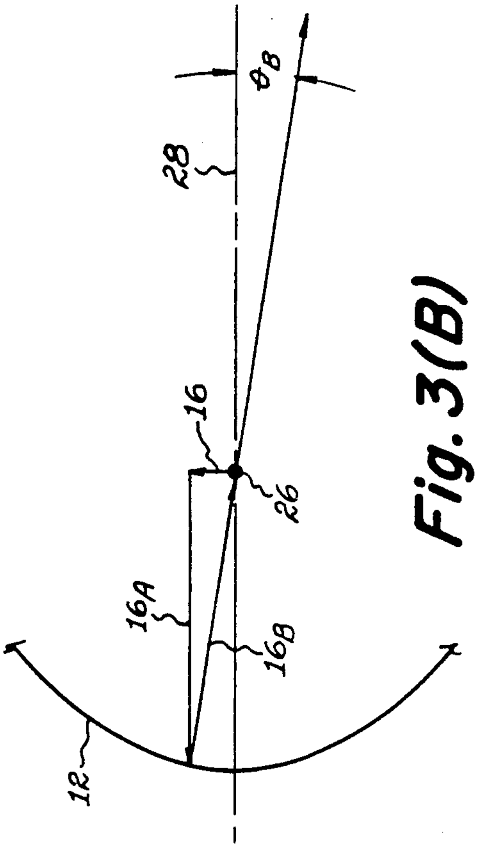

FIGS. 3(A) and 3(B) are interrelated and show a comparison of the divergence of the beam produced by a headlamp using a tungsten filament 116 compared to that produced by a headlamp having the smaller xenon-metal halide light source 16 of the present invention. FIG. 3(A) shows the light source 116 indicated in the form of an arrow having its mid-portion located at the focal point 26 along the axis 28 of the reflector 12, whereas, FIG. 3(B) shows the xenon-light metal halide light source 16 in the form of an arrow having its mid-portion located at the focal point 26 along the axis 28 of reflector 12 having the same dimensions as that of FIG. 3(A). The incandescent light source 116 may have a typical length such as 5 mm, whereas, the xenon-metal halide light source 16 has a length of approximately 3 mm.

The incandescent filament 116 when activated provides for a plurality of reflected light rays that diverge at a rate which is proportional to the size of the light source 116 and is represented by the angle $\theta_A$. Similarly, the xenon-metal halide light source 16 provides for a plurality of light rays that diverge from each other by an angle $\theta_B$.

With reference to FIG. 3(A), the angle of divergence of the light from filament 116 is illustrated by a light ray $\mathbf{116}_A$ emitted from the upper most portion of filament 116 which is intercepted and reflected by reflector 12 as light ray $\mathbf{116}_B$. The angle between the light ray $\mathbf{116}_B$ which passes through the focal point 26 and the axis 28 is the divergence angle $\theta_A$ of the light from the filament 116. For the values previously given to the filament 116 (5 mm) and the reflector 12, (focal length 25 mm) this angle $\theta_A$ is 11.3°.

FIG. 3(B) shows light rays $\mathbf{16}_A$ and $\mathbf{16}_B$ which are similar to light rays $\mathbf{116}_A$ and $\mathbf{116}_B$ described with regard to FIG. 3(A). The angle of the divergence $\theta_B$ produced by the light rays emitted by the xenon-metal halide light source 16, for the previously given values of the light source 16 (3 mm) and the reflector 12 (focal length 25 mm), is 6.80°. The angle of divergence $\theta_B$ is approximately three-fifths smaller than the angle of the divergence $\theta_A$. The overall effect of such light produced by the xenon-metal halide light source 16 is that a desired beam pattern, developed by the automotive headlamp 10 of the present invention and directed to a roadway has less spread and may therefore be directed where it is needed to illuminate the road with less light where it is not wanted. The reduction of this spread or unwanted light by the xenon-metal halide light source 16, relative to an incandescent light source 116, reduces the veiling or concealing effect of fog, rain and snow and thereby provides more useful direct light for automotive applications.

Figure 4A:
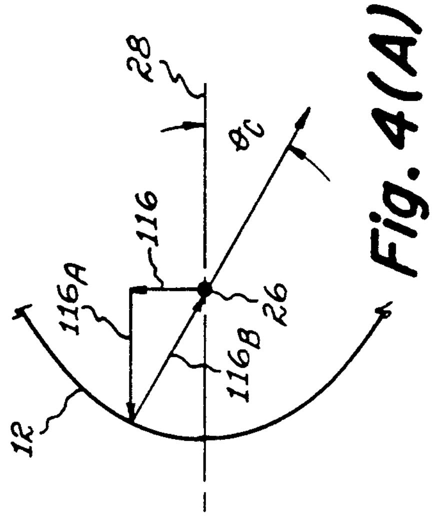
FIGS. 4(A) and 4(B) respectively illustrate a comparison of the effect of the reduction of the size of a reflector on the divergence of the light from an incandescent light source and from the xenon-metal halide light source of the present invention in order to have the same light beam divergence.
Figure 4B:
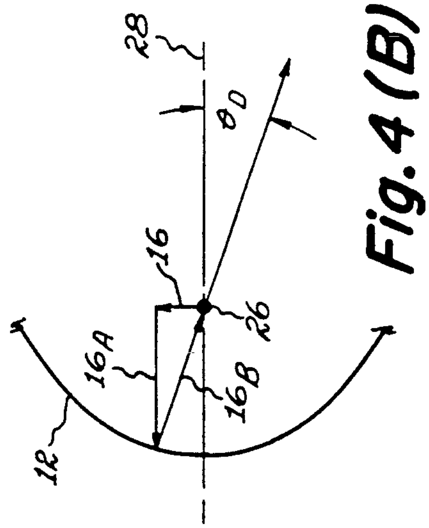

A further advantage provided by the relatively small size of the xenon-metal halide light source 16 is to reduce the necessary size of the reflector of the automotive headlamp and may be described with reference to FIGS. 4(A) and 4(B). FIGS. 4(A) and 4(B) are respectively similar to FIGS. 3(A) and 3(B) and use similar reference numbers where applicable. FIGS. 4(A) and 4(B) are different in that the focal length 26 has been reduced by a factor to two (2) relative to the focal length 26 respectively shown in FIGS. 3(A) and 3(B). Further, the reflector 12 of FIGS. 4(A) and 4(B) has been reduced in height by a factor of about $\frac{2}{3}$ relative to that of FIGS. 3(A) and 3(B).

FIG. 4(A) shows that the tungsten incandescent filament 116 produces light rays $116_A$ and $116_B$ in which ray $116_B$ forms an angle of divergence $\theta_C$ having a value of about 21.8° for the reflector of FIGS. 4(A) and 4(B) with focal length 12.5 mm and previously given value of filament 116 (5 mm length) which would produce stray light in a beam pattern of a sufficient amount for an automotive headlamp that would not meet the needs of the automotive technology. Conversely, FIG. 4(B) shows the xenon-metal halide light source 16 of about 3 mm in length producing light rays $16_A$ and $16_B$ in which ray $16_B$ forms an angle of divergence $\theta_D$ having a value of about 13.5° which produces a beam pattern having a limited amount of stray light so as to more than meet the needs of the automotive technology. The effect of the smaller size xenon-metal halide light source 16 allows for an increase in the collection efficiency of the reflector 12 through a reduction in its focal length and a slightly smaller reduction in its overall dimensions. The overall effect is that the xenon-metal halide light source allows for both decreasing the size of the reflector and improving the collection efficiency of the reflector by sufficient amounts so as to allow the automotive designer to decrease the hood lines of the automobile as discussed in the "Background" section. It is contemplated that the practice of the present invention allows for a reduction of the reflector for an automotive headlamp by a factor of $\frac{2}{3}$ relative to prior automotive headlamp utilizing a typical incandescent filament so that the hood lines of the automobile may be correspondingly reduced.

Figure 5A:
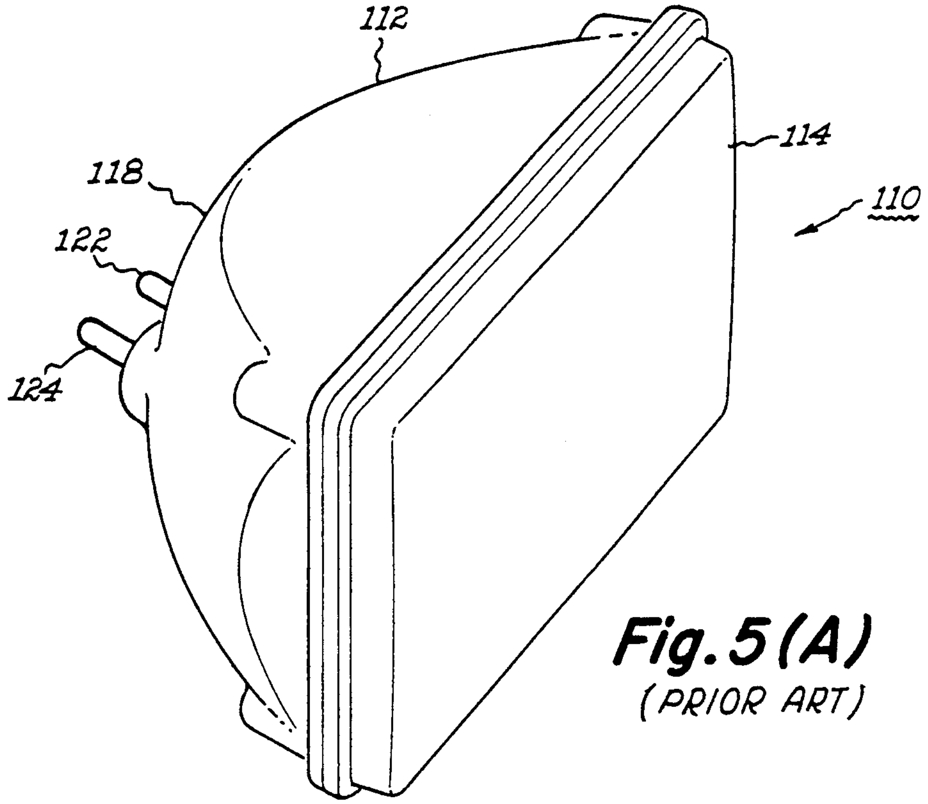
Fig. 5(A) (PRIOR ART)
FIGS. 5(A) and 5(B) are respective perspective views of a prior art rectangular automotive headlamp and a rectangular automotive headlamp in accordance with one embodiment of the present invention.
Figure 5B:
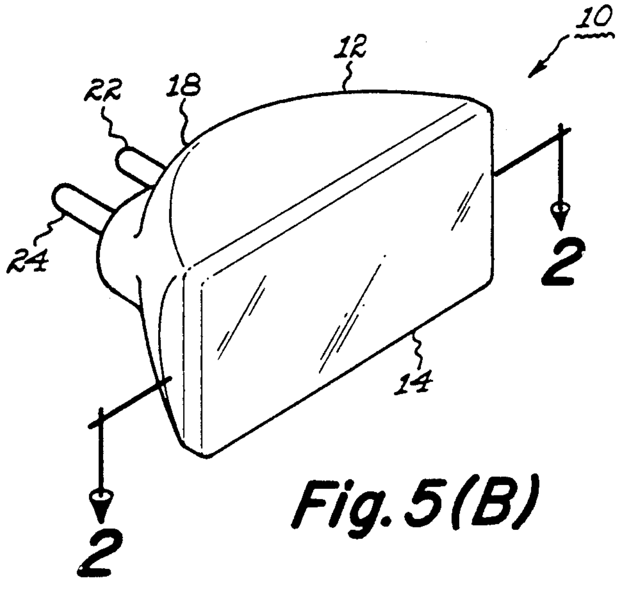

The overall reduction of the dimensions of the reflector and thereby the corresponding dimensions of the automotive headlamp may be illustrated with reference to FIGS. 5(A) and 5(B). FIG. 5(A) is a perspective view illustrative of a prior art rectangular automotive headlamp employing an incandescent filament and having similar elements of the automotive headlamp 10 of FIGS. 1 and 2 with corresponding reference numbers that have been increased by an amount of 100. FIG. 5(B) is a perspective view illustrative of one embodiment of the present invention being a rectangular automotive headlamp 10 shown in FIGS. 1 and 2 and having dimensions that have been reduced relative to the prior art lamp 110 by a factor of about 40% in accordance with the description of the lamp 10 given hereinbefore. From a comparison between FIG. 5(A) of the prior art lamp 110 and the lamp 10 of the present invention FIG. 5(B) is may be easily seen that the practice of the present invention provides the automotive designers with the means in the form of the xenon-metal halide lamp 16 to substantially reduce the hood lines of the automobile.

It should now be appreciated that the practice of the present invention of the xenon-metal halide lamp not only provides for an instant light to serve the illumination needs of the automobile but also because of its reduced dimensions allows for the reduction in the hood lines of the automobiles thereby accommodating the aerodynamic styling desires of the automotive designers.

The xenon-metal halide lamp of the present invention also has a relatively long anticipated life such as 5,000 hours, which, in turn, provides for the needs of the automotive headlamps for more than its anticipated life.

It should further be appreciated that the infrared multi-layer film coating on the outside of the inner envelope of the xenon-metal halide lamp increases the efficiency of the lamp by reflecting the infrared radiation back to the arc of the xenon-metal halide lamp and reduces the undesired ultraviolet energy which may otherwise be detrimental to any plastic members in close proximity to the automotive headlamp.

Although the previously given description of the xenon-metal halide lamp was related to automotive application, it is contemplated that the practice of this invention is equally applicable to other various lighting applications. A significant feature of the light source of the present invention is that a substantial amount of instantaneous light is created by the xenon within the light source which requires a relatively high current and a relatively low voltage and then other ingredients, halide and mercury, are ionized and vaporized allowing for lowering of the current and increasing the voltage so as to yield a high efficient light source. The features of instantaneous light and high efficiency of the present light source allows it to be advantageously utilized in homes, offices and other various commercial and industrial applications.

What we claim as new and desire to secure by Letters Patent of the United States is:

1. A discharge lighting system for producing instant light, comprising:

a light source and supply means for energizing said light source, said light source having a vitreous envelope, a pair of electrodes disposed therein and a fill comprising xenon at a pressure at room temperature in the range of about 2 atmospheres to about 15 atmospheres, mercury, and a metal halide, said supply means being coupled to said electrodes to energize said light source with an initial current that is higher than a second current for sustaining light source operation, said initial current being sufficient to excite said xenon so as to produce instant light from said light source, said supply means further energizing said light source with said second current sufficient to maintain ionization of the mercury and metal halide for sustained light operation.

2. A discharge lighting system according to claim 1 wherein;

said xenon is excited with a relatively large current of about five (5) amperes across said electrodes to produce said instant light.

3. A lighting system according to claim 1 wherein said metal halide consists of sodium and scandium iodines with a molar ration of about 19:1.

4. A lighting system according to claim 1 wherein said envelope of said light source comprises;

(A) a material selected from the group consisting of glass, and quartz, (B) an elongated body having an overall length in the range of about 15 mm to about 40 mm, said body having opposite neck portions having a diameter in the range of about 2 mm to about 5 mm, a bulbous shaped central portion having a mid-portion with an outer diameter in the range of about 6 mm to about 15 mm, and an inner diameter of the bulbous shaped central portion having a range of about 4 mm to 12 mm.

5. A lighting system according to claim 1 wherein said disposed electrodes comprises;

a pair of rod-like members formed of a material selected from the group consisting of tungsten and tungsten with 1% to 3% thorium oxide, said rod-like members being electrically connected by means to respective inleads.

6. A lighting system according to claim 1 wherein said electrodes are disposed at opposed ends of said envelope.

7. A lighting system according to claim 1 wherein said electrodes are both disposed at one end of said envelopes.

8. A lighting system according to claim 1 wherein said inner envelope is coated with a multi-layer infrared reflecting film.

9. A lighting system according to claim 8 wherein said film consists of alternate layers of materials selected from the group consisting of (1) tantalum oxide and silicon dioxide, and (2) titanium oxide and silicon dioxide.

10. An automotive headlamp system for producing instant light comprising:

(A) a reflector having a section to which is mated means capable of being connected to an excitation source, said reflector having a focal point; and (B) a lens mated to the front section of said reflector;

(C) a light source positioned within said reflector so as to be disposed near said focal point of said reflector, said light source having a vitreous envelope with electrodes disposed therein, said light source containing a fill of xenon gas at a pressure at room temperature in the range of about 2 atmospheres to about 15 atmospheres, said fill further including mercury and a metal halide; and (D) supply means for energizing said light source, said supply means being coupled to said electrodes to energize said light source with an initial current that is higher than a second current for sustaining light source operation, said initial current being provided at an initial voltage and being sufficient to excite said xenon so as to produce instant light from said light source, said supply means further energizing said light source with said second current provided at a second voltage and being sufficient to maintain ionization of the mercury and metal halide for sustained light operation, said second voltage being higher than said initial voltage.

11. An automotive headlamp according to claim 10 wherein;

said xenon is excited with a relatively large current of about five (5) amperes across said electrodes to produce said instant light.

12. An automotive headlamp system according to claim 10 wherein said metal halide consists of sodium and scandium iodines with a molar ratio of about 19:1.

13. An automotive headlamp system according to claim 10 wherein said envelope of said light source comprises;

(A) a material selected from the group consisting of glass and quartz, and (B) an elongated body having an overall length in the range of about 15 mm to about 40 mm, said body having opposite neck portions having a diameter in the range of about 2 mm to about 5 mm, a bulbous shaped central portion having a mid-portion with an outer diameter in the range of about 6 mm to about 15 mm, and an inner diameter of the bulbous shaped central portion having a range of about 4 mm to 12 mm.

14. An automotive headlamp system according to claim 10 wherein said disposed electrodes comprises;

a pair of rod-like members formed of a material selected from the group consisting of tungsten and tungsten with 1% to 3% thorium oxide, said rod-like members being electrically connected by means to respective inleads.

15. An automotive headlamp system according to claim 10 wherein said electrodes are disposed at opposed ends of said envelope.

16. An automotive headlamp system according to claim 10 wherein said electrodes are both disposed at one end of said envelopes.

17. An automotive headlamp system according to claim 10 wherein said inner envelope is coated with a multi-layer infrared reflecting film.

18. An automotive headlamp system according to claim 17 wherein said film consists of alternate layers of materials selected from the group consisting of (1) tantalum oxide and silicon dioxide, and (2) titanium oxide and silicon dioxide.

19. A discharge lighting system for producing instant light, comprising:

a light source and supply means for energizing said light source;

said light source having a vitreous envelope, a pair of electrodes disposed therein and a fill comprising xenon at a pressure at room temperature in the range of approximately 2 atmospheres to approximately 15 atmospheres, mercury, and a metal halide;

said supply means being coupled to said electrodes to energize said light source with an initial current that is higher than a second current for sustaining light source operation, said initial current being sufficient to excite said xenon so as to produce instant light from said light source, said supply means further energizing said light source with said second current sufficient to maintain ionization of said mercury and metal halide for sustained operation; and wherein said initial current is provided at an initial voltage thereby resulting in an initial power value for such excitation of said xenon and further wherein, said second current is provided at a second voltage thereby resulting in a second power value for maintenance of such ionization of said mercury and metal halide, said second voltage being higher than said initial voltage.

20. A discharge lighting system as set forth in claim 19 wherein said initial current is higher than said second current by more than a factor of two and said second voltage is sufficiently higher than said initial voltage such that said resultant initial power is greater than said resultant second power value by less than a factor of two.

* * * * *